ELEMENT FEEDING AND ORIENTING MECHANISM

Filed Dec. 27, 1960 2 Sheets-Sheet 1

INVENTOR
ROBERT H. CADWALLADER

BY Everett A. Gartrell

ATTORNEY

Feb. 20, 1962 R. H. CADWALLADER 3,021,938

ELEMENT FEEDING AND ORIENTING MECHANISM

Filed Dec. 27, 1960 2 Sheets-Sheet 2

3,021,938

ELEMENT FEEDING AND ORIENTING MECHANISM

Robert H. Cadwallader, Poughkeepsie, N.Y., assignor to International Business Machines Corporation, New York, N.Y., a corporation of New York Filed Dec. 27, 1960, Ser. No. 78,448
11 Claims. (Cl. 198—33)

The present invention is directed to element feeding and orienting mechanisms. While such a mechanism has wide application, it is particularly useful for feeding electrical components such as transistors to a work station with their leads oriented in a predetermined manner.

In the manufacture of various electrical devices such as transistors, it is often necessary to guide the finished product to individual work stations for the performance of different operations which may include electrical testing, the marking of type numbers, and the packaging in suitable containers. To perform these various operations, it is important that the devices arrive at a work station with the same lead orientation. Heretofore, considerable difficulty has been encountered when one endeavored to orient the devices accurately and reliably at a relatively high speed.

It is an object of the invention, therefore, to provide a new and improved mechanism for automatically feeding and orienting electrical components.

It is another object of the invention to provide a new and improved mechanism for automatically feeding transistors to a work station with their leads oriented in a particular manner.

It is an additional object of the present invention to provide a new and improved transistor feeding and orienting mechanism which is capable of reliable automatic operation at a relatively high speed.

In accordance with a particular form of the invention, an element feeding and orienting mechanism comprises means for guiding a series of elements along a path to a first predetermined position therein, and transfer means movable transversely of that path between the first and second locations and including first and second cams. The mechanism also includes means responsive to the presence of one of those elements at the aforesaid position in the path for moving the transfer means from the first to the second location and causing the first cam to displace that one element beyond the first predetermined position to a second predetermined position. The element feeding and orienting mechanism additionally includes means responsive to the presence of the aforesaid one element in the second predetermined position for orienting that one element in a predetermined relation in that second position. The mechanism further includes means responsive to that one element in the aforesaid predetermined relation for returning the transfer means to the first location and simultaneously causing the second cam to displace that one element beyond the aforesaid second predetermined position while in that predetermined relation.

The foregoing and other objects, features and advantages of the invention will be apparent from the following more particular description of a preferred embodiment of the invention, as illustrated in the accompanying drawings.

Figures 1, 2, 2A:
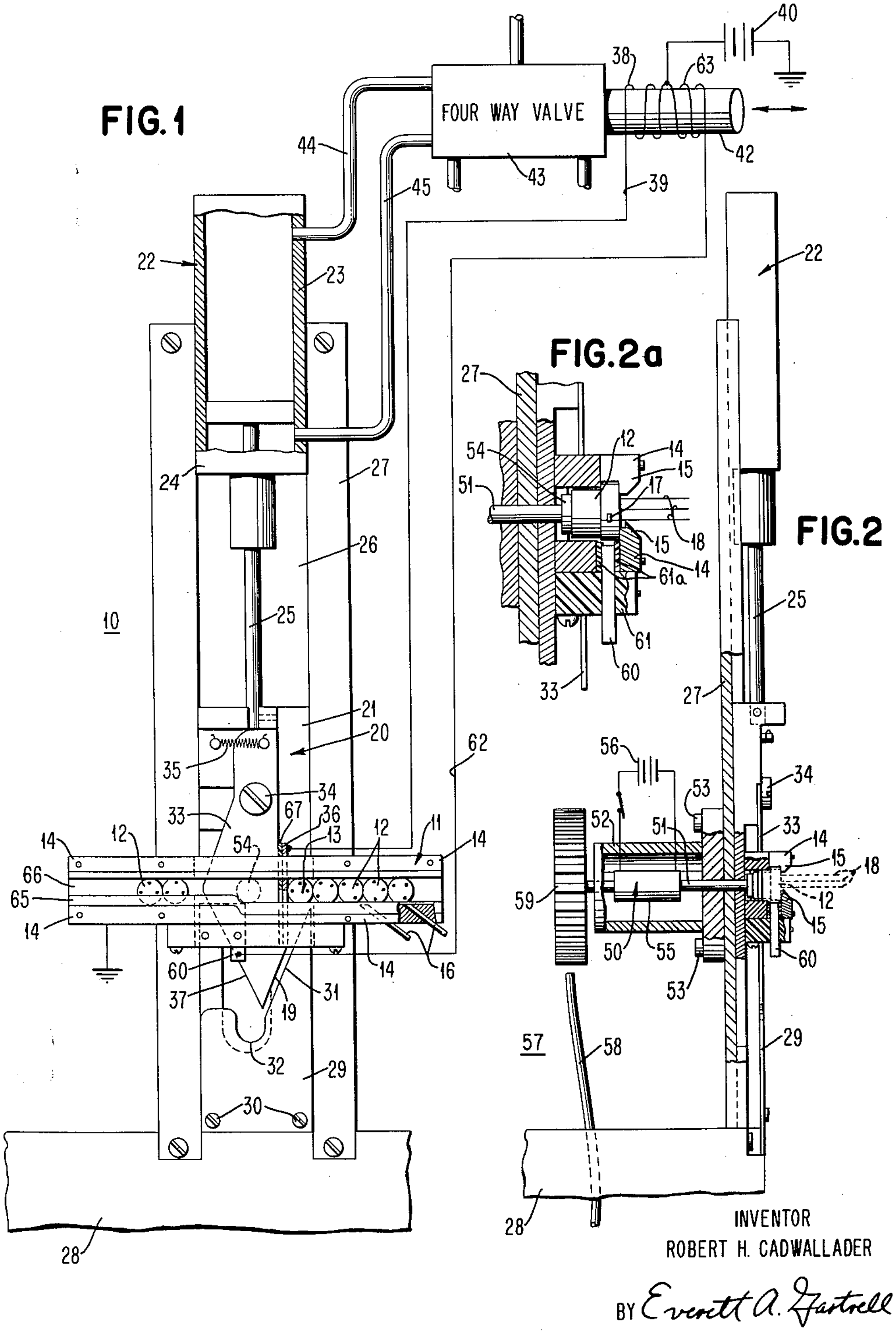
FIG. 1 is a front elevational view of an element feeding and orienting mechanism in accordance with a particular form of the invention.
FIG. 2 is a side elevational view of that mechanism with parts broken away to illustrate various details.
Figure 3:
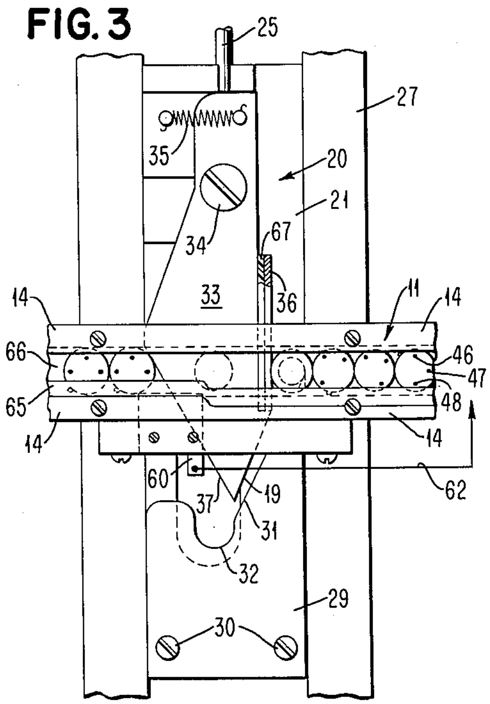
Figure 4:
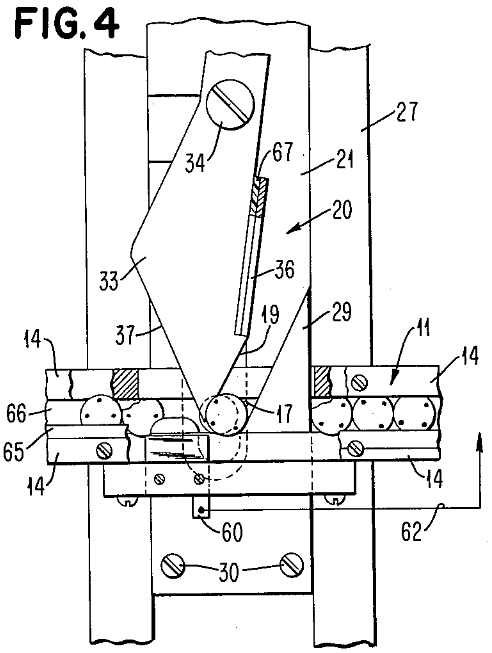
Figure 5:
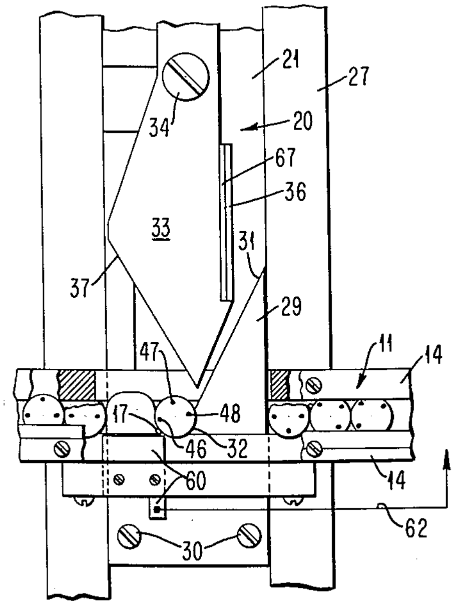

FIG. 2*a* is a view of a detail of the FIG. 2 mechanism to an enlarged scale;

FIG. 3 is an enlarged front elevational view of a portion of the mechanism of FIG. 1 in one of its operative positions;

FIG. 4 is a similar view of a portion of the mechanism in a subsequent operating position;

FIG. 5 is another view of a portion of that mechanism in a later position; and

Figure 6:
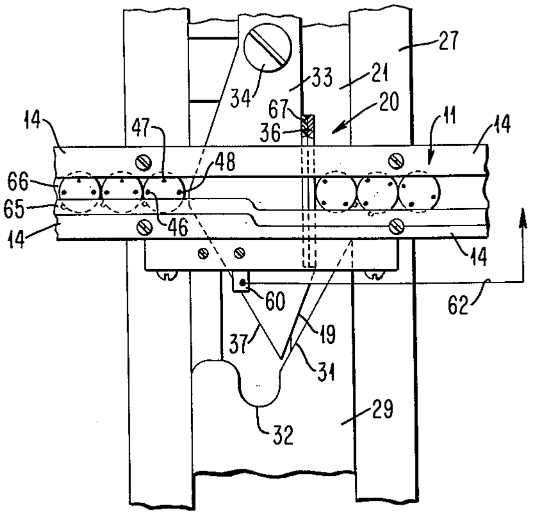

FIG. 6 is a still further view of that portion of the mechanism returned to its original position.

*Description of element feeding and orienting mechanism*

Referring now more particularly to FIG. 1 of the drawings, the element feeding and orienting mechanism 10 includes a means 11 for guiding a series of elements 12 along a path to a first predetermined position 13 to be described subsequently. The guiding means 11 includes a pair of rails 14, 14 having longitudinal flanges 15, 15 (see FIGS. 2 and 2*a*) which are adapted to retain the series of elements as they are advanced from right to left to the position 13 represented in FIG. 1. The guiding means 11 may, for example, be connected to the discharge end of a vibratory feeder bowl (not shown) which, in a well known manner, continuously feeds the elements to the guiding means. Angularly directed air jets 16, 16 may be employed to assist in the feeding of the elements 12. The latter may be suitable electrical components such as transistors which are encapsulated in magnetically permeable cylindrical containers having flat tops and bases, radially extending lugs 17 as shown more clearly in FIGS. 2*a*, 4 and 5, and three leads 18, 18 (see also FIGS. 2 and 2*a*) which project normally to the base of each transistor at points which define a triangle on that base, as represented in FIGS. 1 and 5.

The transistors are fed into the guiding means 11 with their three leads projecting from their bases in a random manner as represented in FIGS. 1 and 3 by the triangle-defining points 46, 47 and 48 which are end views of those leads. It will be noted that points 46 and 48 are disposed along a diameter of the cylindrical transistor and that the spacing between those points is greater than that between the points 46 and 47 or 47 and 48. It is the purpose of the mechanism of the present invention to feed the transistors from right to left and so orient the leads that when the transistors reach the left hand portion of the guiding means 11, the points 46 and 48 are disposed so that they represent the base of the triangle. When the transistors are so disposed at the left-hand or the discharge end of the feeding and orienting mechanism, they are properly oriented so that additional operations such as marking and testing may be automatically performed on those transistors at a suitable work station which is not shown.

The element feeding and orienting mechanism 10 additionally includes a transfer means 20 movable transversely of the path defined by the guiding means 11, which movement is between a first or lower location represented by the position of the transfer means 20 in FIGS. 1 and 6 and a second or upper location which is represented in FIG. 5. The transfer means comprises a carriage 21 which is arranged for reciprocation by a suitable motor such as a conventional pneumatic motor 22 comprising a cylinder 23 and a piston 24 which is connected to the carriage by a piston rod 25. The carriage 21 slides in a passage 26 in an upright member 27 that is suitably fastened to a base 28. The carriage includes a first cam 29 which is rigidly fastened thereto by a pair of screws 30, 30 and which includes a tapered leading edge portion 31. Cam 29 also includes an arcuate notch 32 which is shaped to receive in confining engagement the periphery of a cylindrical transistor 12 as shown in FIG. 5 and in a manner to be explained subsequently. Carriage 21 further includes a second cam 33 which is pivotally mounted thereto by a screw 34 and is yieldingly retained in the position represented in FIG. 1 by a coil spring 35. Cam 33 has a leading edge portion 19 and a trailing edge portion 37, the purposes of which will also be explained later.

The transistor feeding and orienting mechanism further includes means responsive to the presence of one of the transistors at position 13 in the path for moving the carriage 21 from its first location represented in FIG. 1 to its second location located as shown in FIG. 5 and for causing the first cam 29 to displace the transistor at the position 13 to a second predetermined position which is in the notch 32 as represented in FIG. 5. This responsive means comprises a conductive strip 36 which is mounted in insulated relation adjacent the trailing edge 19 of the cam 33 by means of an insulating strip 67, and further comprises a winding 38, a connection 39 between the strip 36 and that winding, and an energizing source such as a battery 40, one terminal of which is connected to the other terminal of the winding while the remaining terminal of the battery is grounded. The guiding means 11 is also grounded as represented at the left hand portion of FIG. 1. The winding 38 is a portion of a solenoid control for an armature 42 that actuates a conventional four-way valve 43 which in turn controls the admission and discharge of fluid for the motor 22 by way of conduits 44 and 45.

The mechanism further includes means responsive to the presence of a transistor in the second predetermined position of that transistor, as represented by its position in FIG. 5 in the arcuate notch 32, for rotating the transistor about its axis and orienting it with its lug 17, its leads, and its triangle-defining points 46, 47 and 48 in a predetermined relation in that second position. This relation is that indicated in FIG. 5 wherein the points 46 and 48 appear at the base of the triangle, point 47 is the upper point of the triangle, and the lug 17 is disposed in the lower left hand position as shown. This means presently under consideration is preferably a rotary magnet 50 which is illustrated in FIG. 2. The magnet 50 includes a soft steel shaft 51 which is rotatably mounted in a housing 52 fastened to the upright member 27 by screws 53, 53. Shaft 51 projects between the rails 14, 14 and has an enlarged end 54 (see FIG. 2*a*) which is adapted to be magnetically coupled to the flat top of a transistor when a winding 55 that is disposed about the shaft is suitably energized by a source represented as a battery 56. Alternatively, the shaft 51 may be a permanent magnet rather than an electromagnet, in which case the winding and the battery may be omitted. The shaft 51 is rotated in a suitable manner such as by an air turbine 57 which includes a jet 58 and a toothed rotor 59.

The transistor feeding and orienting means additionally comprises means including a second control means which is responsive to the transistor in the predetermined relation in the notch 32, as represented in FIG. 5, for controlling the motor 22 and returning the carriage 21 to its first location, as illustrated in FIGS. 1 and 6, and for simultaneously causing the leading edge portion 37 of the second cam 33 to displace the transistor beyond or to the left of that second predetermined position while maintaining the transistor in its predetermined relation. The second control means includes a conductive metal plate 60 (see FIGS. 1, 2*a* and 5) which is mounted in insulated relation on the lower rail 14 of the guiding means 11 by way of insulating members 61 and 61*a* (see FIG. 2*a*). Plate 60 is connected by a conductor 62 to a winding 63 about the armature 40. Winding 63 has a terminal which is common with that of the winding 38 and is also connected to the ungrounded terminal of the battery 40. Windings 38 to 63 are wound in opposite senses and, when they are selectively energized, are effective to actuate the armature 42 in opposite directions. The conductive plate 60 is positioned so that it is engaged by the lug 17 on the transistor when the latter is rotated counterclockwise in the notch 32 to the position represented in FIG. 5. See also FIG. 2*a* where the transistor 12 is being rotated into that position. This engagement with the lug 17 completes the circuit between the grounded guiding means 14 through the transistor casing and its lug 17, the shaft 53, the conductor 62, winding 63, and the battery back to ground and is effective to move the carriage 21 to the position represented in FIG. 6 in a manner to be explained subsequently.

The lower rail 14 adjacent the left-hand or discharge end of the guiding means 11 has a slightly raised or wider portion 65 which creates a narrower opening 66 at that discharge end. The width of this opening is selected so that it is only slightly greater than the perpendicular distance between a point 47 on a transistor in that opening (see FIG. 6) and an imaginary line or diameter drawn through the points 46 and 48. This predetermined width is sufficiently small that it prevents the transistors from being rotated out of the desired predetermined relation represented in the left-hand portion of FIG. 6.

*Explanation of operation of mechanism*

In considering the operation of the mechanism of the present invention, it will be assumed initially that the transistors 12 in the right-hand or inlet portion of the guiding means 11 are disposed with their leads having the random orientation represented in FIG. 1 and that the reciprocating carriage 21 is in the lower position illustrated in that figure. When a transistor 12 arrives at position 13, its metallic container engages the insulated conductive plate 36 and completes an electrical circuit through the container to the grounded guiding means 14. Current now flows from the battery 40 through the winding 38, the conductor 39, plate 36, the container of the transistor, and the guiding means, and the winding 38 is now effective to displace the armature 42 to the left. This in turn permits fluid from a source designated by an arrow above the inlet to the four-way valve 43 to traverse that valve and enter the cylinder 23 of motor 22 by way of the conduit 45. Piston 24 is moved upwardly and exhaust takes place via conduit 44 and the valve 43. The upper displacement of the piston 24 moves the carriage 20 upwardly and, in so doing, the tapered leading edge portion 31 of cam 29 engages the transistor in position 13 as the carriage continues upwardly, as represented in successive positions in FIGS. 3, 4 and 5. It will be noted in these figures that the engaged transistor is gradually displaced to the left in the guiding means 11 until it comes to rest momentarily in the arcuate notch 32 as represented in FIG. 5.

It will be noted that as the carriage 21 moves upwardly, as shown in FIGS. 3 and 4, the transistor is resiliently held between the leading edge portion of cam 29 and the trailing edge portion of the pivoted cam 33. Spring 35 is under tension until the carriage 21 reaches the position shown in FIG. 5 wherein the transistor rests in the arcuate notch 32. In that position the transistor passes beyond the lower tip of cam 33 and the spring 35 moves the tip of the cam to the right and somewhat beyond the right-hand edge of the cylindrical transistor container. When the cam 33 is in the position represented in FIG. 5, the transistor container no longer effectively serves as a switching element and the circuit to the winding 38 is interrupted. However, the armature 42 and the valve 43 remain in the position which was established by the previous energization of the winding 38.

The transistor under consideration is free to rotate in the notch 32, and this rotation is imparted by the rotating shaft 51 of the electromagnet 50 since the transistor container is made of magnetic material attracted by the enlarged end 54 of shaft 51. Rotation continues until the lug 17 on the transistor container engages the conductive plate 60 (see FIGS. 2*a* and 5) which is mounted in insulated relation on the guiding means 11. This engagement completes an electrical circuit between the plate 60 and the guiding means through the transistor container. Current then flows from the battery 40 through the winding 63, conductor 62, plate 60, the transistor container via its lug 17, and the guiding means 11 back to ground. Energization of winding 63 is effective to move the armature 42 to the right and this actuates the four-way valve 43 in a sense to direct the flow of fluid into the cylinder 23 above the piston 24 by way of the conduit 44. The piston and the carriage 21 begin their downward travel and the fluid exhaust from the cylinder occurs by way of conduit 45 and the valve 43. The downward movement of the cam 33 causes its leading edge 37 to engage the transistor under consideration and to displace it to the left as represented in FIG. 6. As the transistor is pushed to the left, its leads designated by the points 46 and 48 tend to ride along just above the raised portion 65 of the lower rail 14. The height of the opening 66 is such that the transistors to the left of cam 33 slide along in the discharge portion of the guiding means 11 and cannot rotate. Consequently the transistors are presented in a predetermined desired relation at a work station (not shown) where additional operations on the transistors such as testing and packaging may be performed by automatic machinery. Succeeding transistors appearing at position 13 represented in FIG. 1 cause the cycle of operation explained above automatically to repeat itself at a high repetition rate.

While the invention has been particularly described with reference to a preferred embodiment thereof, it will be understood by those skilled in the art that various changes in form and details may be made therein without departing from the spirit and scope of the invention.

What is claimed is:

1. An element feeding and orienting mechanism comprising: means for guiding a series of elements along a path to a first predetermined position therein; transfer means movable transversely of said path between first and second locations and including first and second cams; means responsive to the presence of one of said elements at said position in said path for moving said transfer means from said first to said second location and causing said first cam to displace said one element beyond said first predetermined position to a second predetermined position; means responsive to the presence of said one element in said second predetermined position for orienting said one element in a predetermined relation in said second position; and means responsive to said one element in said predetermined relation for returning said transfer means to said first location and simultaneously causing said second cam to displace said one element beyond said second predetermined position while in said predetermined relation.

2. An element feeding and orienting mechanism comprising: means for guiding a series of elements along a path to a first predetermined position therein; transfer means movable transversely of said path between first and second locations and including first and second cams; means responsive to the presenece of one of said elements at said position in said path for moving said transfer means from said first to said second location and causing said first cam to displace said one element beyond said first predetermined position to a second predetermined position; magnetic means responsive to the presence of said one element in said second predetermined position for orienting said one element in a predetermined relation in said second position; and means responsive to said one element in said predetermined relation for returning said transfer means to said first location and simultaneously causing said second cam to displace said one element beyond said second predetermined position while in said predetermined relation.

3. An element feeding and orienting mechanism comprising: means for guiding a series of elements along a path to a first predetermined position therein; transfer means movable transversely of said path between first and second locations and including first and second cams; means responsive to the presence of one of said elements at said position in said path for moving said transfer means from said first to said second location and causing said first cam to displace said one element beyond said first predetermined position to a second predetermined position; a rotary magnet responsive to the presence of said one element in said second predetermined position for rotating said one element and orienting it in a predetermined relation in said second position; and means responsive to said one element in said predetermined relation for returning said transfer means to said first location and simultaneously causing said second cam to displace said one element beyond said second predetermined position while in said predetermined relation.

4. An element feeding and orienting mechanism comprising: means for guiding a series of elements in magnetically permeable containers along a path to a first predetermined position therein; transfer means movable transversely of said path between first and second locations and including first and second cams; means responsive to the presence of one of said elements at said position in said path for moving said transfer means from said first to said second location and causing said first cam to displace said one element beyond said first predetermined position to a second predetermined position; a rotary electromagnet responsive to the presence of the container of said one element in said second predetermined position for rotating said one element by its container and orienting it in a predetermined relation in said second position; and means responsive to said one element in said predetermined relation for returning said transfer means to said first location and simultaneously causing said second cam to displace said one element beyond said second predetermined position while in said predetermined relation.

5. An element feeding and orienting mechanism comprising: means for guiding a series of elements along a path to a first predetermined position therein; transfer means movable transversely of said path between first and second locations and including a first cam having a leading edge portion and a second cam having leading and trailing edge portions; means responsive to the presence of one of said elements at said position in said path for moving said transfer means from said first to said second location and causing said first cam to displace said one element between its leading edge portion and the trailing edge portion of said second cam beyond said first predetermined position to a second predetermined position; means responsive to the presence of said one element in said second predetermined position for orienting said one element in a predetermined relation in said second position; and means responsive to said one element in said predetermined relation for returning said transfer means to said first location and simultaneously causing said second cam to displace said one element by its leading edge portion beyond said second predetermined position while in said predetermined relation.

6. An element feeding and orienting mechanism comprising: means for guiding a series of elements along a path to a first predetermined position therein; transfer means reciprocable transversely of said path between first and second locations and including a first cam fixed to said transfer means and having a leading edge portion and a second cam pivoted to said transfer means and having leading and trailing edge portions; means responsive to the presence of one of said elements at said position in said path for moving said transfer means from said first to said second location and causing said first cam to displace said one element confined between its leading edge portion and the trailing edge portion of said second cam beyond said first predetermined position to a second predetermined position; means responsive to the presence of said one element in said second predetermined position for orienting said one element in a predetermined relation in said second position; and means responsive to said one element in said predetermined relation for returning said transfer means to said first location and simultaneously causing said second cam to displace said one element by its leading edge portion beyond said second predetermined position while in said predetermined relation.

7. An element feeding and orienting mechanism comprising: means for guiding a series of elements along a path to a first predetermined position therein; transfer means movable transversely of said path between first and second locations and including first and second cams; means including a first control means responsive to the presence of one of said elements at said position in said path and including a motor for moving said transfer means from said first to said second location and causing said first cam to displace said one element beyond said first predetermined position to a second predetermined position; means responsive to the presence of said one element in said second predetermined position for orienting said one element in a predetermined relation in said second position; and means including a second control means responsive to said one element in said predetermined relation for controlling said motor and returning said transfer means to said first location and simultaneously causing said second cam to displace said one element beyond said second predetermined position while in said predetermined relation.

8. An element feeding and orienting mechanism comprising: means for guiding a series of elements along a path to a first predetermined position therein; transfer means movable transversely of said path between first and second locations and including first and second cams; means effectively including a first switch responsive to the presence of one of said elements at said position in said path and including a motor responsive to the condition of said switch for moving said transfer means from said first to said second location and causing said first cam to displace said one element beyond said first predetermined position to a second predetermined position; means responsive to the presence of said one element in said second predetermined position for orienting said one element in a predetermined relation in said second position; and means effectively including a second switch responsive to said one element in said predetermined relation for controlling said motor and returning said transfer means to said first location and simultaneously causing said second cam to displace said one element beyond said second predetermined position while in said predetermined relation.

9. An element feeding and orienting mechanism comprising: means for guiding a series of elements along a path to a first predetermined position therein; transfer means movable transversely of said path between first and second locations and including a first cam having a leading edge portion and a second cam having leading and trailing edge portions; means including a first control means responsive to the presence of one of said elements at said position in said path and including a motor for moving said transfer means from said first to said second location and causing said first cam to displace said one element between its leading edge portion and the trailing edge portion of said second cam beyond said first predetermined position to a second predetermined position; means responsive to the presence of said one element in said second predetermined position for orienting said one element in a predetermined relation in said second position; and means including a second control means responsive to said one element in said predetermined relation for controlling said motor and returning said transfer means to said first location and simultaneously causing said second cam to displace said one element by its leading edge portion beyond said second predetermined position while in said predetermined relation.

10. An element feeding and orienting mechanism comprising: means for guiding a series of elements in magnetically permeable containers along a path to a first predetermined position therein; transfer means movable transversely of said path between first and second locations and including a first cam having a leading edge portion and a second cam having leading and trailing edge portions; means including first control means responsive to the presence of one of said elements at said position in said path and including a motor for moving said transfer means from said first to said second location and causing said first cam to displace said one element between its leading edge portion and the trailing edge portion of said second cam beyond said first predetermined position to a second predetermined position; a rotary magnet responsive to the presence of the container of said one element in said second predetermined position for rotating said one element by its container and orienting it in a predetermined relation in said second position; and means including a second control means responsive to said one element in said predetermined relation for controlling said motor and returning said transfer means to said first location and simultaneously causing said second cam to displace said one element by its leading edge portion beyond said second predetermined position while in said predetermined relation.

11. A transistor feeding and orienting mechanism comprising: means for guiding a series of transistors along a path normal to their axes to a first predetermined position therein, each of said transistors being encapsulated in a magnetically permeable cylindrical container having a flap top and a flat base with a radially extending lug and leads projecting normally to said base at points defining a triangle; transfer means movable transversely of said path between first and second locations and including a first cam having a leading edge portion and a second cam having leading and trailing edge portions; means including first control means responsive to the presence of one of said transistors at said position in said path and including a motor for moving said transfer means from said first to said second location and causing said first cam to displace said one transistor between its leading edge portion and the trailing edge portion of said second cam means beyond said first predetermined position to a second predetermined position with its leads and triangle-defining points randomly disposed; rotary magnetic means responsive to the presence of the top of said one transistor in said second predetermined position for rotating said one transistor about its axis and orienting it with its lug, its leads, and triangle-defining points in a predetermined relation in said second position; and means including a second control means responsive to said one transistor in said predetermined relation for controlling said motor and returning said transfer means to said first location and simultaneously causing said second cam to displace said one transistor by its leading edge portion beyond said second predetermined position while in said predetermined relation.

References Cited in the file of this patent

UNITED STATES PATENTS 2,907,367 Cormia ................ Oct. 6, 1959